United States Patent

Gerkin et al.

Patent Number: 6,077,877
Date of Patent: *Jun. 20, 2000

[54] REACTIVE AMINE CATALYSTS FOR USE IN POLYURETHANE POLYMERS

[75] Inventors: Richard M. Gerkin, Cross Lanes; K. Kaye Robinson, Scott Depot, both of W. Va.

[73] Assignee: CK Witco Corporation, Greenwich, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/832,451

[22] Filed: Apr. 3, 1997

Related U.S. Application Data

[60] Provisional application No. 60/014,843, Apr. 4, 1996.

[51] Int. Cl.⁷ ............... C08G 18/14; C08G 18/18; C08G 18/48
[52] U.S. Cl. ............... 521/129; 521/172; 521/174; 558/452; 560/130; 560/157; 562/561; 564/194; 564/197; 564/198; 544/358; 544/359
[58] Field of Search ............... 564/197, 194, 564/198; 544/358, 359; 521/128, 117, 118, 129, 130, 157, 164, 170, 172, 173; 558/452; 560/130, 157; 562/561

[56] References Cited

U.S. PATENT DOCUMENTS

| | | |
|---|---|---|
| 3,878,247 | 4/1975 | Moss et al. . |
| 4,011,223 | 3/1977 | Priest et al. ............... 260/268 R |
| 4,049,591 | 9/1977 | McEntire et al. . |
| 4,105,600 | 8/1978 | Muller et al. . |
| 4,143,071 | 3/1979 | McEntire et al. . |
| 4,251,461 | 2/1981 | Livingston . |
| 4,256,665 | 3/1981 | McEntire . |
| 4,256,666 | 3/1981 | McEntire . |
| 4,259,259 | 3/1981 | McEntire . |
| 4,267,372 | 5/1981 | Rothenberg et al. . |
| 4,287,363 | 9/1981 | McEntire . |
| 4,384,950 | 5/1983 | McCoy . |

OTHER PUBLICATIONS

Chemical Abstracts, vol. 118, No. 14, Apr. 5, 1993, Abstract No. 125107b, K.V. Shirshin, et al. "Interaction of methyl-(meth)acrylate with N,N–dimethylaminopropylamine".

*Primary Examiner*—Shailendra Kumar
*Attorney, Agent, or Firm*—Raymond D. Thompson

[57] ABSTRACT

The present invention provides amine/amide catalysts for use in catalyzing the formation of polyurethane. The amine/amide catalysts, which have low fugitivity due to their reactivity with isocyanates, and good catalytic activity, have the structure

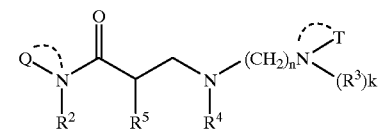

wherein Q is $C_zH_{2z+1}$, or $(CH_2)_nN(R^3)_kT$, T is a monovalent $C_1$–$C_4$ alkyl, amino-$C_1$–$C_4$-alkyl, mono-$C_1$–$C_4$-alkylamino-$C_1$–$C_4$-alkyl, or di-$C_1$–$C_4$-alkylamino-$C_1$–$C_4$-alkyl group, or T is a divalent alkyl, amine substituted alkyl, alkylaminoalkyl, or alkoxyalkyl group which forms with the nitrogen atom shown in structure (I) to which T is attached a cyclic structure which incorporates up to 6 carbon atoms in the ring as well as the nitrogen atom shown in structure (I), which cyclic structure may be substituted with $C_1$ to $C_4$ alkyl;

k=0 or 1, being 1 if T is a monovalent group and 0 if T is a divalent group; $R^2$=H or $C_zH_{2z+1}$; $R^3$=$C_zH_{2z+1}$; $R^4$=H; $R^5$=H or $CH_3$; n=2 to 6; and z=1 to 4. "n" is preferably 2 to 3 and z is preferably 1. Each $R^3$ and T may be the same or different, as may each value of n and z. One specific preferred range of structures is those in which Q is $C_zH_{2z+1}$.

17 Claims, No Drawings

REACTIVE AMINE CATALYSTS FOR USE IN POLYURETHANE POLYMERS

This application claims priority from U.S. Provisional Application Ser. No. 60/014,843, filed Apr. 4, 1996.

BACKGROUND OF THE INVENTION

Certain amine catalysts are known in the polyurethane industry such as propanamide, N,N-dimethyl-3-[dimethylamino] (DDPA, Structure 1), which is the simplest of a series of catalysts, having no reactive functional groups, for the formation of polyurethane described in U.S. Pat. No. 4,011,223.

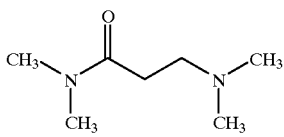

(1)

A similar non-reactive analog that has been found useful as a polyurethane catalyst is propanamide, 3-[bis-(3-[dimethylamino]propyl)]amino-N,N-dimethyl as described in U.S. Pat. No. 4,049,591.

Additionally, a number of hydroxyl, and primary/secondary amine containing tertiary amine polyurethane catalysts are described in the article "Factors Affecting the Discoloration of Vinyl That Has Been Molded Against Urethane Foam," R. L. Zimmerman and T. L. Austin, Polyurethane World Congress 1987, September 29–October 2, pp. 693–697, 1987. However, all of these catalysts have deficiencies in either activity, with the hydroxy substituted cases, or with volatility, such as in the unsubstituted case.

U.S. Pat. No. 4,384,950 describes the use of a substituted form of DDPA as a demulsifier for breaking oil-in-water emulsions from tar-sand bitumen recovery. The reference, however, does not describe the use of this compound as a catalyst for urethane systems. The reaction used in the preparation of the substituted compound involves addition/condensation of methacrylic or acrylic acid with dimethylaminopropylamine. Methods of manufacture of said compound are disclosed in U.S. Pat. Nos. 4,256,665 and 4,259,259.

SUMMARY OF THE INVENTION

The present invention provides amine/amide catalysts for use in catalyzing the formation of polyurethane. The amine/amide catalysts have low volatility in the resulting polyurethane (i.e., low fogging) and reactivity at least as good as the most reactive component in the system [see Priester, R. D. Jr., R. D. Pefley and R. B. Turner, "High Resiliency Polyurea Foam—An Improved Flexible Foam Matrix, *Journal of Cellular Plastics*, 30(2) 1994, pp. 147, which is incorporated herein by reference]. These compounds are tertiary amine/amides that have similar base structures to DDPA, but contain secondary amine groups for reacting into the polymer matrix. Unexpectedly, these highly reactive compounds have a catalytic activity which is very close to that of the completely unsubstituted catalyst DDPA.

The structure of the tertiary amine/amides of the present invention is:

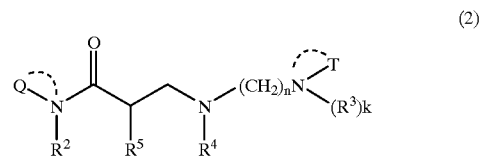

(2)

Q is $C_zH_{2z+1}$, or $(CH_2)_nN(R^3)_kT$ and T is a divalent cyclic group, by which is meant a group which is attached at both its ends to the nitrogen to form a cyclic group, or T is a monovalent alkyl, aminoalkyl or alkylaminoalkyl group, k=0 or 1, being 1 if T is a monovalent group and 0 if T is a divalent group; $R^2$=H or $C_zH_{2z+1}$; each occurrence of $R^3$=$C_zH_{2z+1}$; $R^4$=H; $R^5$=H or $CH_3$; n=2 to 6; and each occurrence of z=1 to 4. "n" is preferably 2 or 3 and z is preferably 1. T when monovalent may be an alkyl group of one to four carbons which may have one or more amines thereon (e.g., amino-$C_1$–$C_4$-alkyl) or therein (e.g., mono- or di-$C_1$–$C_4$-alkylamino-$C_1$–$C_4$-alkyl). T when divalent may be alkyl, amine substituted alkyl, alkylaminoalkyl, or alkoxyalkyl which forms with the nitrogen atom shown in structure (2) to which T is attached a cyclic structure which incorporates up to 6 carbon atoms in the ring as well as the nitrogen atom shown in structure (2) and optionally a second nitrogen atom or an oxygen atom in the ring, e.g., morpholino, piperazino. Said cyclic structures may include $C_1$ to $C_4$ alkyl substitutions on the ring.

Another aspect of the present invention is methods of forming polyurethane by combining the polyol and polyisocyanate reactants in the presence of an effective amount of one or more than one compound of formula (2) to catalyze the reaction of said reactants.

DETAILED DESCRIPTION OF THE INVENTION

A preferred subset of the amine/amides of the present invention is:

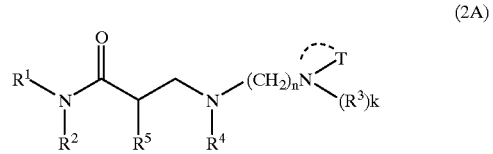

(2A)

or more particularly

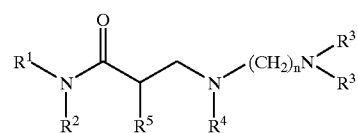

(2B)

wherein $R^1$=$(R^3)_2N(CH_2)_n$ or $C_zH_{2z+1}$; $R^2$, $R^3$, $R^4$, $R^5$, T, k, n and z are as above. "n" is preferably 2 or 3 and z is preferably 1. Each $R^3$ may be the same or different, as may each value of n and z. One specific preferred range of structures for 2A and 2B is those in which $R^1$ is $C_zH_{2z+1}$. Preferred specific compounds are:

(3)
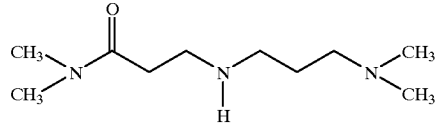

and (4)
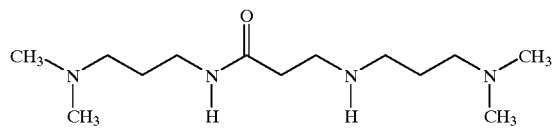

An example of such a cyclic terminated structures is:

(2C)
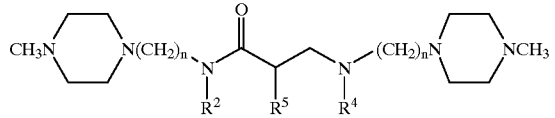

These compounds may be manufactured as known in the art for the manufacture of amine/amide. Generally, the catalysts are prepared from the direct reaction of dimethylaminopropylamine (DMAPA) or other similar amines, with methyl acrylate (MA), dimethyl acrylamide (DMAA) or similar unsaturated materials. The products of these reactions are substantially the aminopropionamides of the present invention containing lesser amounts of unreacted raw materials and other adducts such as:

(5)
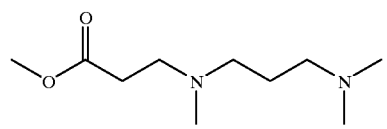

(6)
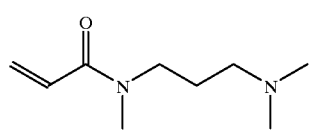

(7)
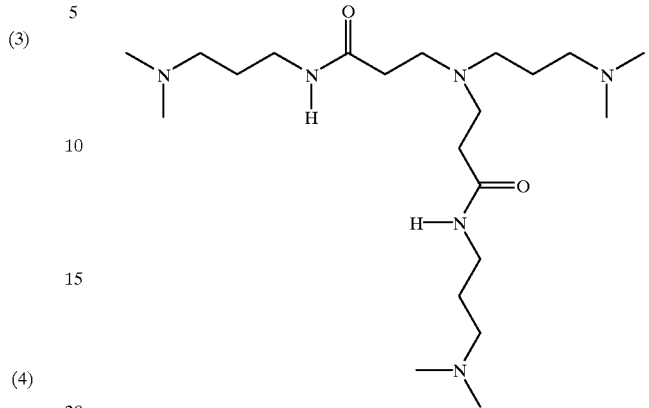

Methods of manufacture of compounds of Structure 4 are specifically disclosed in U.S. Pat. Nos. 4,256,665 and 4,259,259, which are incorporated herein by reference.

These amine/amide catalysts are used for the catalysis of the reaction to form polyurethane, i.e., catalyze the isocyanate/water and/or isocyanate/alcohol reactions. Said polyurethanes may be rigid, flexible slabstock, ester slabstock, molded microcellular elastomer or other types of foams as are known in the art. The amine/amides of the present invention can be used in amine pre-blends, i.e., mixtures with other amine catalysts, surfactants, or other additives or polyurethane components as are known in the art.

Foam formulations with which the compounds of the present invention can be used as catalysts usually comprise (a) a polyether polyol containing an average of more than two hydroxyl groups per molecule; (b) an organic polyisocyanate; (c) at least one catalyst for production of polyurethane foam; (d) water; (e) a surfactant, preferably any of the silicone/polyether copolymers known in this field for this purpose; and (f) an inert gas.

The polyols have an average number of hydroxyl groups per molecule of at least slightly above 2 and typically 2.1 to 3.5. Generally, the polyol should have an equivalent weight of about 400 to 1500 or even 400 to 3000 grams/equivalent and an ethylene oxide content of less than 20%. Useful polyols include but are not limited to polyether polyols such as alkylene oxide adducts of polyhydroxyalkanes, alkylene oxide adducts of non-reducing sugars and sugar derivatives, alkylene oxide adducts of polyphenols, and alkylene oxide adducts of polyamines and polyhydroxyamines. The alkylene oxides are preferably based on ethylene oxide or propylene oxide.

The organic polyisocyanate contain at least two isocyanate groups, e.g., toluene diisocyanates (TDI), and the index of the foam is typically 60 to 130.

The water generally comprises on the order of 1 to 12 php (parts by weight per hundred parts of polyol).

Other additives may be added to the polyurethane foam to impart specific properties to the foam, including, but not limited to, coloring agents, flame retardants, and GEO-LITE® Modifier foam additives (available from Organo Silicones Group of Witco Corporation, Greenwich, Conn.).

The inert gas is one which is soluble in the foam formulation at elevated pressures, but will come out of solution (i.e., blow) at atmospheric pressure. An exemplary such gas is CO$_2$, but nitrogen, air or other common gases, including hydrocarbon gases, such as methane and ethane may also be used. The inert gas may also comprise a volatile organic compound such as a pentane isomer or a hydrochlorocarbon that boils above ambient temperature but has a sufficiently high vapor pressure at ambient temperature that its vapor represents a substantial component of the gas in the cells of the foam.

The silicone copolymer surfactants should be capable of helping to form a stable foam and should be present in an amount effective to stabilize the polyurethane foam, i.e., an amount which is generally about 0.05 to 5 wt. percent of the total reaction mixture, preferably 0.2 to 1.5 wt. percent.

The foam is manufactured by mixing the ingredients (that is, ingredients (a) through (f)) together such that byproduct gas generated during the reaction foams the polyurethane. The foam can also be made by the injection of inert gas, whereby the reactants are put under high pressure (i.e., at least greater than atmospheric pressures) so that the inert gas is dissolved in the reactant mixture. Then the mixture is flashed, by releasing the pressure, which causes the gas to form bubbles at nucleation sites in the foaming system and thus act as a blowing agent. This produces a reduced density foam. For a more complete description of this process and the equipment required therein, see European Patent Publication No. 0 645 226 A2, which is incorporated herein by reference.

The compounds of the present invention may also be used in non-foam polyurethane reactions, such as polyurethane elastomer formation. In such polyurethanes, the water in the formulation is often replaced with a chain extender, which is a low molecular weight (<400) active hydrogen containing compound with at least two reactive groups. Examples are 1,4-butanediol, ethylene glycol, diethylene glycol and ethylene diamine.

The conditions and formulations for these reactions are known in the art, e.g., "Polyurethane Handbook," 2nd ed., Gunter Ortel, ed., Hanser Publishers, Cincinnati, 1994, which is incorporated herein by reference. Generally, these catalysts are used at a catalytically effective amount, i.e., in an amount to effectively catalyze the reaction to form the polyurethane. Generally said effective amount is about 0.02–5.0 parts per hundred parts of polyol in the reaction formulation. In molded flexible foam, which is described in the examples below, these catalysts resulted in cream and exit times slightly faster than for DDPA, and the load properties (ILD) and cure characteristics of the foams were at least as good for DDPA.

EXAMPLES

Glossary:

php: Parts of product per 100 parts of polyol in the formulation.

Polyol 1: An ethylene oxide/propylene oxide polyether sold by ARCO Chemical as ARCOL Polyol E-656.

Polyol 2: An ethylene oxide/propylene oxide polyether sold by ARCO Chemical as ARCOL Polyol E-688.

Polyol 3: A propylene oxide polyether sold by Dow Chemical as VORANOL 490.

Polyol 4: A propylene oxide polyether sold by Dow Chemical as VORANOL 800.

Polyol 5: A polyester polyol sold by Stepan Chemical as PS-3152.

Polyol 6: A polyester polyol sold by Witco as FOMREZ 53.

Silicone 1: A silicone surfactant sold by Witco as NIAX surfactant L-3001.

Silicone 2: A silicone surfactant sold by Witco as NIAX surfactant Y-10829.

Silicone 3: A silicone surfactant sold by Witco as NIAX surfactant L-6900.

Silicone 4: A silicone surfactant sold by Witco as L-532.

Surfactant 1: An organic surfactant sold by Union Carbide Corp. as NP-9.

Catalyst 1: An amine catalyst sold by Witco as NIAX catalyst A-1.

Catalyst 2: An amine catalyst sold by Witco as NIAX catalyst A-33.

Catalyst 3: An amine catalyst sold by Witco as NIAX catalyst A-99.

Isocyanate 1: A diphenyl methylene diisocyanate (MDI) variant sold by Dow Chemical as ISONATE 143-L Isocyanate 2: The standard commercial mixture of 80% 2,4 and 20% 2,6 toluene diisocyanate.

Isocyanate 3: An MDI variant sold commercially by Dow Chemical as PAPI 27.

IFD: Foam load values as determined by ASTM D-3574 Test B1

General Synthesis: Uncatalyzed reaction of certain primary amine containing tertiary amines with acrylates or methacrylates The synthesis of the following tertiary amine/amides was conducted in a 500 mL round-bottom four-neck flask. The flask was equipped with a pressure equalizing addition funnel, mechanical stirrer, nitrogen purge, thermometer and heating mantle. Either one mole of DMAA and one mole of the amine of interest, or one mole of MA and two moles of the amine were used. If the amine it was primary, it was weighed into the flask and the DMAA or MA was weighed into the addition funnel. If the amine was not primary, the order was reversed (i.e., the amine was placed in the addition funnel and the DMAA or MA in the flask). Specific details of reactions are outlined below.

Example 1

Synthesis of Amines/Amides of the Present Invention

Propanamide, 3-[3-dimethylaminopropyl]amino-N,N-dimethyl—One mole of the DMAPA (dimethylaminopropylamine, 102.21 g) was weighed into the flask. The system was purged with nitrogen for several minutes. The DMAA was added (6 mL/min.) to the flask while the mixture was being stirred and the temperature was being monitored. The initial temperature was 24° C. and did not change during the addition. Once the DMAA addition was complete, the flask was heated to 100° C. and held for two hours with stirring. Structure #3 above was obtained at 90+% conversion.

Propanamide, 3-[3-dimethylaminopropyl]amino-N-[3-dimethylaminopropyl]—The synthesis of the MA/DMAPA version of the amine was conducted by the procedure above using two moles of DMAPA (204.42 g) and one mole of MA (86.10 g). During the addition of the MA the temperature increased from and initial temperature of 24° C. to a final temperature of 75° C. The temperature was held at 75° C. for two hours. The sample was then stripped on a rotary evaporator for four hours at 70° C., 5 mm Hg to remove methanol. Structure #4 above was obtained at 92+% conversion.

Propanamide, 3-[3-dimethylaminopropyl]amino-N-[3-dimethylaminopropyl], 2-methyl—The synthesis of the methylmethacrylate (MMA)/DMAPA version of the amine was conducted by the procedure listed above using two moles of DMAPA (204.42 g) and one mole of mMA (86.10 g). During the addition of the MMA the temperature did not change from the initial temperature of 24° C. The temperature was increased to 120° C. for a total of twenty-four hours. The sample was stripped on a rotary evaporator for four hours at 70° C., 5 mm Hg to remove methanol. The following structure was obtained at approximately 80% conversion:

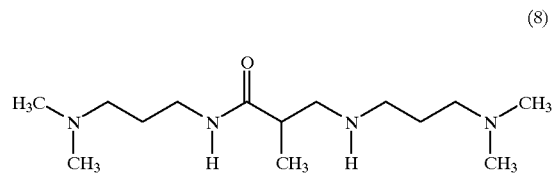

(8)

Example 2

Synthesis of Comparative Catalysts

Propanamide, 3-[dimethyl]amino-N,N-dimethyl was made, starting from DMAA (one mole) was added to a stirred reactor under nitrogen. Dimethylamine (one mole) was added at such a rate as to keep the temperature in the reactor <35° C. When all of the dimethylamine was added, the reactor was held between 35 and 45° C. for about two hours. After that time, temperature was increased to 60° C. for an additional 5 hours. After cooling to 25° C., the reaction was complete and the product analyzed. The analysis confirmed the anticipated structure of DDPA at 99+% conversion. Similarly, propanamide, 3-[3-methyl-3-hydroxyethyl]amino-N,N-dimethyl (9) was made from DMAA and MEOA (N-methylethanolamine).

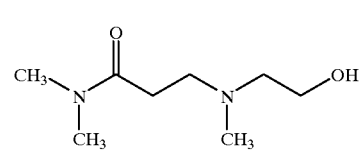

(9)

Additionally, propanamide, 3-[bis(2-hydroxyethyl)amino]-N,N-dimethyl (10) was made from DMAA and DEOA (diethanolamine).

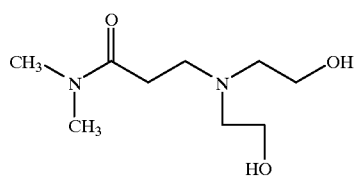

(10)

Propanamide, 3-[3-methyl-3-hydroxyethyl]amino-N-methyl-N-hydroxyethyl (11) was made from MA and MEOA.

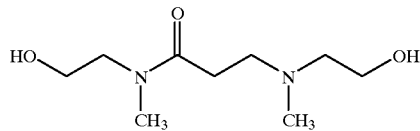

(11)

Propanamide, 3-[bis(2-hydroxyethyl)amino]-N,N-[bis(2-hydroxyethyl)] (12) was made from MA and DEOA.

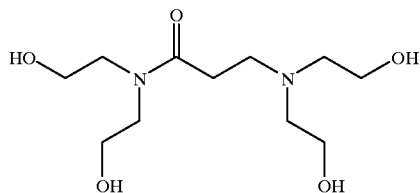

(12)

Example 3

Evaluation in a Simple Water Blown Urethane Foam

Each of the reactive DDPA catalysts was evaluated in terms of its blow and gel capabilities relative to DDPA. To obtain blow capabilities a simple system of 97.22 php (0.049 eq.) of Polyol 1, 1.79 php (0.195 eq.) of water, 1 php of Surfactant 1 and Isocyanate 1 at 103 index was used. A total of 50 grams of premade polyol, water, surfactant blend was weighed into a lined one pint paper cup. The catalysts were evaluated by adding 0.25 g (0.5 php) or 0.5 g (1.0 php) to this mixture. Isocyanate was added and the mixture stirred on a drill press for 5 seconds. Blow capabilities were determined by measuring top-of-cup and blow-off times as compared to DDPA. Data are presented in Table 1.

TABLE 1

Water Blown Foam Examples

| Run | Structure # | php | Top-of-Cup (sec)[a] | Krel DDPA[b] | Blow (s)[c] |
|---|---|---|---|---|---|
| 1 | 1 | 0.5 | 168 | 1.00 | >300 |
| 2 | 1 | 1.0 | 53 | 1.00 | 114 |
| 3 | 4 | 0.5 | 157 | 0.93 | 300 |
| 4 | 4 | 1.0 | 60 | 1.13 | 113 |
| 5 | 3 | 0.5 | 190 | 1.13 | >300 |
| 6 | 3 | 1.0 | 130 | 2.45 | 235 |
| 7 | 9 | 0.5 | >600 | >3.57 | >600 |
| 8 | 9 | 1.0 | 227 | 4.28 | >300 |
| 9 | 11 | 0.5 | >600 | >3.57 | >600 |
| 10 | 11 | 1.0 | 236 | 4.45 | >300 |
| 11 | 10 | 0.5 | >600 | >3.57 | >600 |
| 12 | 10 | 1.0 | >600 | >11.3 | >600 |
| 13 | 12 | 0.5 | >600 | >3.57 | >600 |
| 14 | 12 | 1.0 | >600 | >11.3 | >600 |

[a]The top-of-cup time represents the time (seconds) at which the rising foam reached the height of the cup.
[b]The Krel DDPA value represents the relative activity of the catalyst and was obtained by dividing the top-of-cup time for the amine-amide by the top-of-cup time for the DDPA at a given use level. For Run 3; 157 sec/ 168 sec 0.93 = Krel DDPA at 0.5 php.
[c]The blow time represents the time (seconds) at which gasses visibly escaped from the foam.

Table 1 shows this comparison in a simple water blown urethane foam formulation. Each catalyst was evaluated at levels 0.5 and 1.0 php, and rise (top-of cup) and blow-off times noted. It is clear that the candidates break down into two families, those with activities reasonably close to that of the control DDPA (Runs 2–6) and those with significantly poorer activity (Runs 7–14). The foams of Runs 3–6 contain the preferred catalysts noted above (Structures 3 and 4), while Runs 7–14 were catalyzed with the poorer performing hydroxyl containing candidates (Structures 9–12). The difference in overall performance is significant, suggesting unique catalytic behavior of the preferred structures.

Example 4

Evaluation in a Urethane Elastomer

A similar experiment was used to evaluate the gel capabilities of the reactive DDPA catalysts relative to DDPA. The resin blend consisted of 94 php (0.047 eq.) of Polyol 1 and 6 php (0.193 eq.) of ethylene glycol. Isocyanate 1 was used at 103 index. A total of 100 grams of the resin blend was weighted into a lined pint-size paper cup. Isocyanate was added and stirred by hand. The catalysts were evaluated at 3 php. Gel capabilities were determined by measuring gel time (point at which mixture was too viscous to stir by hand) and tack-free time as compared to DDPA. Data are presented in Table 2.

TABLE 2

Urethane Elastomer Examples

| Run | Structure #[a] | gel (s)[b] | Krel DDPA[c] | tack-free (s)[d] |
|---|---|---|---|---|
| 1 | 1 | 26 | 1.00 | 26 |
| 2 | 4 | 42 | 1.62 | 48 |
| 3 | 3 | 70 | 2.69 | 80 |
| 4 | 9 | 170 | 6.54 | 210 |
| 5 | 11 | 180 | 6.92 | 255 |
| 6 | 10 | >600 | >26 | >600 |
| 7 | 12 | >600 | >26 | >600 |

[a]All catalysts were evaluated at 3.0 parts. Amine equivalents based only on tertiary amine content @ 3.0 part use level.
[b]The gel time represents the time at which the mixture is to viscous to be stirred by hand.
[c]The Krel DDPA value represents the relative activity of the corresponding catalyst as compared to DDPA. (gel time of amine-amide of interest/gel time of DDPA).
[d]The tack-free time represents the time at which the mixture is tack free to the touch.

Runs 2 and 3 confirm that Structures 3 and 4 have activities reasonably close to that of DDPA, while all of the other candidates are very much slower. This significant difference in this elastomer system confirms the unique catalytic character of these compounds and the broad scope of their utility.

Example 5

Evaluation in a Molded Flexible Foam Formulation

The catalysts were then evaluated in a molded flexible foam formulation. The control formulation contained 80 php of Polyol 1, 20 php of Polyol 2, 1.2 php Silicone 2, 1.5 php of DEOA, 3.56 php of water, 0.23 php of Catalyst 2, 0.14 php of Catalyst 1, and 0.25 php of "DDPA blend" (see Table 3). Isocyanate 2 was used at an Index of 100. The reactive DDPA catalysts were blended exactly like the "DDPA blend", replacing the DDPA with each catalyst to be evaluated. The new blends were used in place of the "DDPA blend" at equal parts in the formulation. The mixture was mixed (drill press) for 55 seconds, the isocyanate was added and mixed for another 5 seconds after the isocyanate addition. The foams were made in an aluminum mold with 1/16 inch vents. The mold temperature was 150° F. (tempered water heating) with a demold time of 3.5 minutes. Foams made were compared by measuring cream and exit times, 50% or 75% ILD values, and cure response. Data are presented in Table 3.

TABLE 3

Catalyst Comparison in a Flexible Molded Foam

| Run | Structure #[c] | php | cream, sec | exit time[a] | 50% ILD[b] | 75% ILD | cure |
|---|---|---|---|---|---|---|---|
| 1 | 1 | 0.25 | 5 | 40.5 | 152 | 230 | OK |
| 2 | 4 | 0.25 | <5 | 36.9 | nm[e] | 240 | OK |
| 3 | 4 | 0.50 | 3.5 | 36.4 | nm | 270 | OK |
| 4 | 3 | 0.25 | 5 | 37.8 | nm | 225 | OK |
| 5 | 3 | 0.50 | 3.5 | 36.6 | nm | 220 | OK |
| 6 | 9 | 0.25 | 5 | 42 | 115 | nm | OK |
| 7 | 9 | 0.50 | 5 | 40.8 | 125 | nm | OK |
| 8 | 12 | 0.25 | 5 | 43.5 | nm | 210 | OK |
| 9 | 12 | 0.50 | 5 | 42.8 | nm | 223 | OK |
| 10 | 11 | 0.25 | 5 | 40 | nm | 195 | OK |
| 11 | 11 | 0.50 | 3.5 | 39.8 | nm | 200 | OK |
| 12 | 10 | 0.25 | 5 | 40.5 | nm | 162 | sl set[e] |
| 13 | 10 | 0.50 | 4 | 39.8 | nm | 174 | OK |

[a]The exit time represents the time at which the first amount of foam was visible in the mold vents.
[b]ILD indicates indentation load deflection.
[c]Indicated amine-amide catalyst 33.5%/(TERGITOL 15-S-7 surfactant (Union Carbide Corp.) 66.5%.
[d]nm indicates that this value was not measured.
[e]sl set indicates that the cure was slow The performance of the preferred catalysts is given in Runs 2–5. These catalysts resulted in cream and exit times slightly faster than those for the DDPA control blend, and the load properties (ILD) and cure characteristics of the foams were at least as good as the control. This is additional evidence that the typical catalytic activity of these tertiary amine/amide compounds is very close to that of DDPA. The performance of the hydroxyl containing candidates is shown in Runs 6–13. While similar to DDPA, they tend to give somewhat longer exit times (i.e., are slower to react) and lower load properties.

Example 6

Confirmation of the Reactivity of Amine/Amide with Isocyanate

Structure 4 (0.315 g, 0.00265 m) was added to a small reactor followed by phenyl isocyanate (0.684 g, 0.00265 m). Immediately upon mixing, there was a significant exotherm and a notable increase in the viscosity of the mixture suggesting a fast reaction. After about three minutes, a sample of the mixture was taken which confirmed that all of the phenyl isocyanate had been consumed. This result confirms that these compounds react readily with isocyanate, supporting the concept that they will react into the foam and be non-volatile.

Example 7

Evaluation in Rigid Foam Formulation

The catalysts were evaluated in a rigid foam formulation containing 60 php of Polyol 3, 15 php of Polyol 4, 25 php of Polyol 5, 2 php Silicone 3, 1.0 php of water, 36 php of HCFC-141b blowing agent. Isocyanate 3 was used at an Index of 120. Structure 4 was used as the catalyst for evaluation. All components except the isocyanate were premixed in a pint-size lined paper cup. The mixture was mixed (drill press) for 10 seconds, the isocyanate was added and mixed for another 3 seconds. The mixture was then transferred to a lined paper bucket and cream, string and gel, and final rise times were measured. Data represented in Table 4 demonstrate that catalyst 4, of the present invention yielded good rigid foam.

TABLE 4

Catalyst Evaluation in Rigid Foam

| grams | 1.13 | 1.13 | 2.20 | 2.30 |
|---|---|---|---|---|
| cream (sec) | 29.23 | 29.65 | 18.60 | 16.14 |
| string/gel (sec) | 87.17 | 77.87 | 51.02 | 50.38 |
| tack-free (sec) | 88.25 | 116.50 | 60.52 | 59.86 |
| final rise (sec) | 140.00 | 160.47 | 101.38 | 100.00 |
| density (pcf) | 1.85 | 1.85 | 1.81 | 1.82 |

Example 8

Evaluation in Polyester Foam Formulation

Structure 4 was also evaluated in a polyester foam formulation. Two foams were made: a control and a foam using structure 4 as a replacement for DDPA at equal amine equivalents. The formulations are listed in Table 5 below. The TDI was added to the polyol and the mixture was hand mixed until it was clear. Then, the polyol/TDI mixture was mixed at 1000 rpm for 8 seconds. The water, amine, surfactant premix was added with a syringe and mixing was continued for 7 seconds. The mixture was then immediately poured into a card box (20×20×20 cm) and cream and blow times were monitored along with the rise profile. Cream times of the control foam and experimental foam were 13 seconds each. Blow times for the two foams were 119 seconds and 121 seconds, respectively. No differences in the two foams were observed.

TABLE 5

Catalyst Evaluation in Polyester Foam Formulation

| Components | Control foam, php | Structure 4, php |
|---|---|---|
| Polyol 6 | 100 | 100 |
| Water | 4 | 4 |
| Silicone 4 | 1.4 | 1.4 |
| Surfactant 1 | 0.42 | 0.43 |
| Catalyst 3 | 0.175 | 0.175 |
| DDPA | 0.105 | — |
| Structure 4 | — | 0.095 |
| Isocyanate 2 (103 index) | 48.29 | 48.29 |
| Cream, seconds | 13 | 13 |
| Blow, seconds | 119 | 121 |

Example 9

Verification of Nonfugitivity

Fugitivity studies were also performed on a series of polyester foams made using each of the following catalysts: N-ethyl morpholine, N-methyl morpholine, N,N-dimethyl benzylamine, n-hexadecyldimethylamine, and Structure 4. The following formulation was used: Polyol 6, water, silicone 4, surfactant 1, Isocyanate 2 at 103 index. Each of the catalysts was evaluated at the use level required to give a blow time of 41 seconds. The Polyol was weighed into a 32 oz. paper cup. The TDI was added to the polyol and the mixture was hand mixed until it was clear. Then, the polyol/TDI mixture was mixed at 1000 rpm for 8 seconds. The water, amine, surfactant premix was added with a syringe and mixing was continued for 7 seconds. The mixture was then immediately poured into a paper bucket and top-of-cup times were recorded.

Then, approximately 0.2 gram samples of each of the foams were taken from the center of a foam sample cut from the second inch from the bottom of the bucket. These samples were placed in glass vials and sealed and were analyzed on a DB-1 (30 meter×0.32 mm) column using a Varian 3760 Gas Chromatograph equipped with a Perkin Elmer HS-40 Headspace Autosampler. Data are shown below.

TABLE 6

Fugitivity Data

| Catalyst | Use Level[a] php | Normalized Area Counts |
|---|---|---|
| NEM | 2.2 | 179,166,699 |
| NMM | 1.6 | 150,597,591 |
| (N,N-dimethylbenzylamine | 1.6 | 244,905,456 |
| n-hexadecyldimethylamine | 1.4 | 0[b] |
| Structure 4 | 1.3 | 0[b] |

[a]Required php to give a top-of-cup time of 41 sec.
[b]Less than detection limit (<1,000,000).

The above data confirm that Structure 4 has no detectable volatility. Thus, we anticipate that Structure 4 would be nonfugitive in foam applications.

What is claimed is:

1. A process for the formation of polyurethane, comprising reacting a polyol component and a polyisocyanate component in the presence of an effective amount of an amine/amide of the structure:

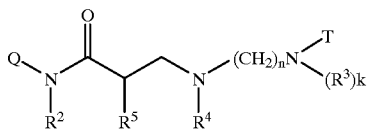

wherein

Q is $C_zH_{2z+1}$, or $(CH_2)_nN(R^3)_kT$;

T is a monovalent $C_1$–$C_4$ alkyl, amino-$C_1$–$C_4$-alkyl, mono-$C_1$–$C_4$-alkylamino-$C_1$–$C_4$-alkyl, or di-$C_1$–$C_4$-alkylamino-$C_1$–$C_4$-alkyl group, or T is a divalent alkyl, amine substituted alkyl, alkylaminoalkyl, or alkoxyalkyl group which forms with the nitrogen atom shown in structure (I) to which T is attached a cyclic structure which incorporates up to 6 carbon atoms in the ring as well as the nitrogen atom shown in structure (I), which cyclic structure may be substituted with $C_1$ to $C_4$ alkyl;

k=0 or 1, being 1 if T is a monovalent group and 0 if T is a divalent group; wherein $R^1$ is $C_zH_{2z+1}$, $R^2$=H or $C_zH_{2z+1}$; each occurrence of $R^3$=$C_zH_{2z+1}$; $R^4$=H; $R^5$=H or $CH_3$; n=2 to 6; and each occurrence of z=1 to 4.

2. A process according to claim 1 wherein Q is $R^1$ wherein $R^1$ is $C_zH_{2z+1}$.

3. A process according to claim 1 wherein n is 2 to 3 and z is 1.

4. A process according to claim 3 wherein $R^1$ is methyl.

5. A process according to claim 1 wherein $R^3$ is methyl.

6. A process according to claim 1 wherein $R^5$ is hydrogen.

7. A process according to claim 1 wherein the amine/amide is of the structure:

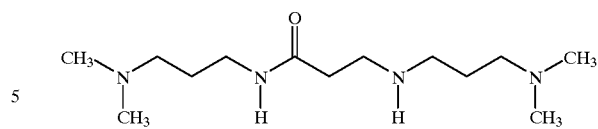

8. A process according to claim 1 wherein the polyurethane formed is an elastomer.

9. A process according to claim 1 wherein the polyurethane formed is a polyurethane foam.

10. A process according to claim 9 wherein the foam is molded flexible foam.

11. A process according to claim 9 wherein the foam is rigid foam.

12. A process according to claim 1 wherein the amine/amide is present at 0.02 to 5 parts per hundred parts of polyol.

13. A process according to claim 12 wherein the amine/amide is of the structure

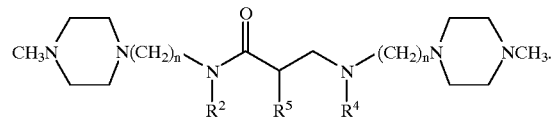

14. A process according to claim 1 wherein a chain extender is present during the formation of the polyurethane.

15. A process according to claim 1 wherein the polyol has an equivalent weight of between 400 to 1500 and an average number of hydroxyl groups of about 2.1 to 3.5 and the index of the foam is between 60 and 130.

16. A process according to claim 1 wherein T is an alkyl group of one to four carbons which may have one or more amines thereon.

17. A process according to claim 1 wherein T is a divalent be alkyl, amine substituted alkyl, alkylaminoalkyl, or alkoxyalkyl which forms with the nitrogen atom to which T is attached a cyclic structure which incorporates up to 6 carbon atoms in the ring as well as the nitrogen atom.

* * * * *